United States Patent
Bi et al.

(10) Patent No.: US 9,668,176 B2
(45) Date of Patent: May 30, 2017

(54) METHOD FOR SELECTING SHUNT GATEWAY AND CONTROLLER

(71) Applicant: ZTE Corporation, Shenzhen (CN)

(72) Inventors: Yifeng Bi, Shenzhen (CN); Yuhong Li, Shenzhen (CN); Lin Li, Shenzhen (CN); Tian Tian, Shenzhen (CN); Jing Wang, Shenzhen (CN); Jun Wang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 15/119,518

(22) PCT Filed: Jun. 26, 2014

(86) PCT No.: PCT/CN2014/080876
§ 371 (c)(1),
(2) Date: Aug. 17, 2016

(87) PCT Pub. No.: WO2015/120685
PCT Pub. Date: Aug. 20, 2015

(65) Prior Publication Data
US 2017/0013512 A1    Jan. 12, 2017

(30) Foreign Application Priority Data
Feb. 17, 2014    (CN) .......................... 2014 1 0053668

(51) Int. Cl.
*H04W 8/08*    (2009.01)
*H04W 36/00*    (2009.01)
(Continued)

(52) U.S. Cl.
CPC ..... *H04W 36/0022* (2013.01); *H04L 61/2069* (2013.01); *H04W 8/082* (2013.01);
(Continued)

(58) Field of Classification Search
None
See application file for complete search history.

(56) References Cited

U.S. PATENT DOCUMENTS

2011/0085565 A1    4/2011   Yang
2012/0178416 A1    7/2012   Miklos
(Continued)

FOREIGN PATENT DOCUMENTS

CN    102158915 A    8/2011
CN    102238704 A    11/2011
(Continued)

OTHER PUBLICATIONS

OpenFlow Switch Specification, Open Networking Foudation, ONF TS-015, version 1.3.3 (protocol version 0x04), Sep. 27, 2013, pp. 1-164.*
(Continued)

*Primary Examiner* — Benjamin Lamont
(74) *Attorney, Agent, or Firm* — Oppedahl Patent Law Firm LLC

(57) ABSTRACT

Provided is a method for selecting a shunt gateway and a controller. The method includes that: the controller allocates an Anycast address of Serving Gateways (S-GWs) for a user equipment, and sends the Anycast address to all of the S-GWs; the controller sends the Anycast address to a radio-side network element via a Mobility Management Entity (MME); and when the controller receives a Packet_In message and a first uplink data packet from the user equipment sent by an S-GW, the controller selects the S-GW as an S-GW for the user equipment.

17 Claims, 4 Drawing Sheets

(51) Int. Cl.
*H04W 36/12* (2009.01)
*H04L 29/12* (2006.01)
*H04W 8/26* (2009.01)
*H04W 88/16* (2009.01)

(52) U.S. Cl.
CPC ............. *H04W 8/26* (2013.01); *H04W 36/12* (2013.01); *H04W 88/16* (2013.01)

(56) References Cited

U.S. PATENT DOCUMENTS

| 2013/0332619 | A1* | 12/2013 | Xie | H04L 67/2823 709/230 |
| 2015/0023176 | A1 | 1/2015 | Korja | |
| 2015/0055461 | A1 | 2/2015 | Hahn | |
| 2015/0358401 | A1* | 12/2015 | Flavel | H04L 67/1095 370/235 |
| 2016/0197831 | A1* | 7/2016 | De Foy | H04L 45/7453 370/392 |

FOREIGN PATENT DOCUMENTS

| CN | 102480528 A | 5/2012 |
| WO | 2011053216 A1 | 5/2011 |
| WO | 2013127429 A1 | 9/2013 |
| WO | 2013149637 A1 | 10/2013 |

OTHER PUBLICATIONS

International Search Report in international application No. PCT/CN2014/080876, mailed on Nov. 19, 2014.
English Translation of the Written Opinion of the International Search Authority in international application No. PCT/CN2014/080876, mailed on Nov. 19, 2014.
S_Matsushima: "Stateless user-plane architecture for virtualized EPC (vEPC)", Jul. 10, 2013 (Jul. 10, 2013), pp. 1-19, XP055257978, Retrieved from the Internet: URL: https://tools.ietf.org/pdf/draft-matsu shima-stateless-uplane/vepc-00.pdf [retrieved on Mar. 14, 2016]* Chapters 1, 2.2, 3.1-3.4 ** figures 3, 5, 6 * mailed on Jul. 10, 2013.
"OpenFlow Switch Specification, Version 1.4.0", ONF TS-012, Oct. 14, 2013 (Oct. 14, 2013), pp. 1-206, XP055235997, Retrieved from the Internet: URL: https:www.opennetworking.org/images/stories/downloads/sdn-resources/onf-specifications/openflow/openflow-spec-vl.4.0.pdf [retrieved on Dec. 14, 2015]* Chapter 7.4.1 *mailed on Oct. 14, 2013.
Supplementary European Search Report in European application No. 14882759.5, mailed on Feb. 20, 2017.

* cited by examiner

METHOD FOR SELECTING SHUNT GATEWAY AND CONTROLLER

TECHNICAL FIELD

The present disclosure relates to mobile communications and, in particular to, a method for selecting a shunt gateway and a controller.

BACKGROUND

Selected Internet Protocol (IP) Traffic Offload (SIPTO) defined in the 3rd Generation Partnership Project (3GPP) is a method for shunting a specific service close to a position where a User Equipment (UE) is attached to an access network. Specifically speaking, in addition to supporting the access of a mobile core network, a mobile communication system (including a home NodeB system) can also support an IP shunt function, thereby implementing local access of a mobile terminal to other IP equipment in a home network or the internet when a radio-side network element has a capability of IP shunt and a user agrees to allow the IP shunt.

A Software Defined Network (SDN) is a novel network innovation framework, and a core technology OPENFLOW thereof is achieved by separating a network device control plane from a data plane and integrating functions of the network device control plane into an OPENFLOW controller or serving the functions of the network device control plane as an application connected to a northbound interface of the controller, thereby achieving flexible control over a network traffic and providing a good platform for innovation of the core network and the application.

Anycast refers to identification of a group of specific service hosts in an IP network via an Anycast address, wherein a message with a destination address as the Anycast address can be routed by the IP network to a host closest to a sender in the group of specific service hosts. Each source node of the Anycast corresponds to a group of receiving nodes, only one being capable of receiving the message sent by the sender.

FIG. 1 is a diagram illustrating an SDN-based SIPTO implementation system. The IP shunt is achieved by setting a shunt gateway in FIG. 1. The shunt gateway, serving as a gateway locally accessing an external network (such as the Internet), includes a Serving Gateway (S-GW) and a Local Gateway (L-GW). Based on an idea of separating a control plane from a data forwarding plane, control functions of the S-GW and a Packet Data Network Gateway (P-GW) and/or the L-GW are separated from a data forwarding function. An S-GW/P-GW/L-GW control plane function can be achieved in the controller after being software, and an interface between the control plane function and the OPENFLOW controller is an internal interface. The control plane function can also serve as an external application provided over the OPENFLOW controller, and the northbound interface is adopted as the interface between the control plane function and the OPENFLOW controller. A specific mode depends on network deployment, which is not limited in the present disclosure. Data are forwarded by a uniform user plane gateway (such as the S-GW, the P-GW and the L-GW) under the centralized control of a Controller. Meanwhile, the user plane gateway is also compatible with a conventional radio-side network element which is an Evolved NodeB (eNB) or a Home eNB (HeNB) and/or a home NodeB gateway. As shown in FIG. 1, each gateway is the uniform user plane gateway. No matter which implementation mode of the control plane function is adopted, functions of a forwarding plane and an interface between the control plane and the forwarding plane are free from any influence. Therefore, the implementation modes are no longer distinguished below in the present disclosure, and upper layer control functions except the functions of the forwarding plane are generally regarded as the controller instead.

Since the SIPTO is the method for shunting the specific service close to the position where the UE is attached to the access network, it is very important how to select the shunt gateway close to the attachment position of the user. The shunt gateway is randomly selected by the controller in a conventional method, and the shunt gateway selected in such a way is not optimal.

SUMMARY

In order to solve the abovementioned problems, the embodiments of the present disclosure provide a method for selecting a shunt gateway and a controller.

A method for selecting a shunt gateway is provided, which includes that:

a controller allocates an Anycast address of S-GWs for a UE, and sends the Anycast address to all of the S-GWs; the controller sends the Anycast address to a radio-side network element via an MME; and when the controller receives a Packet_In message and a first uplink data packet from the UE sent by the S-GW, the controller selects the S-GW as an S-GW for the UE.

Preferably, the step that the controller sends the allocated Anycast address to the radio-side network element via the MME may include that:

the controller sends the Anycast address to the MME via a session establishment response message: and the MME sends the allocated Anycast address to the radio-side network element via a radio bearer establishment request message or a path conversion acknowledgement message or a switching request message.

Preferably, before the controller allocates the Anycast address of the S-GWs for the UE in an attachment process or a Packet Data Network (PDN) connection establishment process, the method may further include that:

the MME receives an attachment request or a PDN connection request from the UE; and the MME sends a session establishment request to the corresponding controller.

Preferably, before the controller allocates the Anycast address of the S-GWs for the UE in a switching process, the method may further include that:

the MME receives a path conversion request message from a target-side radio network element or a forwarding re-locating request message from an original MME, and the MME sends a session establishment request to the corresponding controller.

Preferably, the S-GW and the L-GW are separated and after the controller selects the S-GW as the S-GW for the UE, the method may further include that:

the controller issues a traffic table including an IP address of the L-GW to the selected S-GW, and issues a traffic table including an IP address of the selected S-GW to the L-GW.

Preferably, the method may further include that:

the controller sends an IP address of the radio-side network element to the selected S-GW.

Preferably, the method may further include that:

when the controller receives a session deletion request from the MME in a de-attachment process or a PDN disconnection process, the controller sends a message of deleting the allocated Anycast address and the IP address of the radio-side network element to the selected S-GW.

Preferably, when the controller has received a bearer correction request from the MME, the method may further include that: the controller sends the IP address of the radio-side network element to all of the S-GWs.

A controller is provided by the embodiments of the present disclosure, which includes:

an allocating module, configured to allocate an Anycast address of S-GWs for a UE, send the Anycast address to all of the S-GWs, and send the Anycast address to a radio-side network element via an MME;

a receiving module, configured to receive a Packet_In message and a first uplink data packet from the UE sent by an S-GW; and a selecting module, configured to select the S-GW as an S-GW for the UE.

Preferably, the controller may further include:

an issuing module, configured to issue a traffic table including an IP address of an L-GW to the selected S-GW, and issue a traffic table including an IP address of the selected S-GW to the L-GW.

Preferably, the controller may further include:

a sending module, configured to send an IP address of the radio-side network element to the selected S-GW.

Preferably, the receiving module may be configured to receive a session deletion request from the MME; and the sending module may be configured to send a message of deleting the allocated Anycast address and the IP address of the radio-side network element to the selected S-GW.

Compared with the conventional art, in the embodiments of the present disclosure, the Anycast address of the S-GWs is allocated for the UE by the controller, and the allocated Anycast address is sent to all of the S-GWs; the allocated Anycast address is sent to the radio-side network element via the MME; and when the controller receives a Packet_In message and a first uplink data packet sent by an S-GW, the controller selects the S-GW and selects the L-GW as the shunt gateway according to the selected S-GW and network topological information. By means of the solutions of the present disclosure, an optimal shunt gateway can be selected, thereby reducing the resource consumption of network transmission, shortening the transmission time delay of service data and improving an internet experience of a user.

BRIEF DESCRIPTION OF THE DRAWINGS

The drawings in the embodiments of the present disclosure are described below to provide further understanding of the present disclosure and explain the present disclosure together with the description. The drawings are not intended to limit the protection scope of the present disclosure.

DETAILED DESCRIPTION

The present disclosure is further described below with reference to the drawings so as to be conveniently understood by those skilled in the art. The detailed description is not intended to limit the protection scope of the present disclosure.

Figure 2:
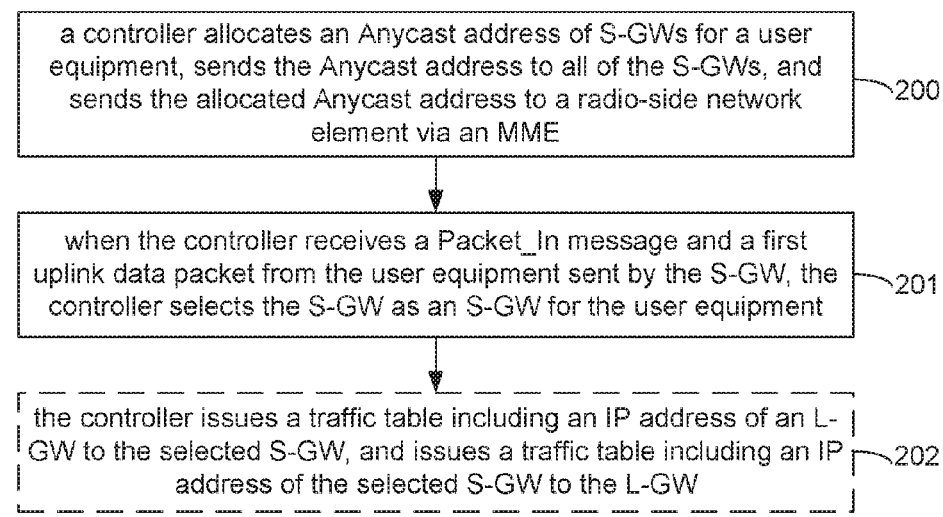
FIG. 2 is a flow chart showing a method for selecting a shunt gateway according to an embodiment of the present disclosure.

As shown in FIG. 2, the embodiments of the present disclosure provide a method for selecting a shunt gateway including an S-GW and a corresponding L-GW. The method includes the following steps.

Step 200: a controller allocates an Anycast address of S-GWs for a UE and sends the allocated Anycast address to all of the S-GWs; the controller sends the allocated Anycast address to a radio-side network element via an MME (Mobility Management Entity).

Before the step is carried out in an attachment process or a PDN connection establishment process, the method further includes that:

the MME receives an attachment request or a PDN connection request from the UE and sends a session establishment request to the corresponding controller.

After receiving a message of the session establishment request, the controller waits for receiving a Packet_In message and a first uplink data packet from the UE.

In a switching process, before the step is carried out, the method further includes that:

the MME receives a path conversion request message from a radio network element at the target side or a forwarding re-locating request message from an original MME, and sends a session establishment request to the corresponding controller.

After receiving a message of the session establishment request, the controller waits for receiving the Packet_In message and the first uplink data packet.

In the step, the Anycast address of the S-GWs, allocated for the UE, is an Internet Protocol Version 6 (IPV6) address. As long as the allocated Anycast address is an address which is not used, specific selection can be performed by using a conventional method, which is not used for limiting the protection scope of the present disclosure.

In the step, the step that the allocated Anycast address is sent to the radio-side network element via the MME includes that: in response to the message of session establishment request sent by the MME, the controller sends the Anycast address to the MME via a session establishment response message; and the MME sends the allocated Anycast address to the radio-side network element via a radio bearer establishment request message or a path conversion acknowledgement message or a switching request message.

In the session establishment response message, the Anycast address allocated by the controller is carried, and therefore the MME obtains the Anycast address.

In the attachment process or the PDN connection establishment process, the MME sends the radio bearer establishment request message to the radio-side network element (such as an eNB), Thus, the MME sends the Anycast address to the radio-side network element (such as the eNB) via the radio bearer establishment request message.

In the switching process, if the MME does not change, the MME sends the path conversion acknowledgement message to a radio network element (such as the eNB) at the target side and the Anycast address is carried.

If the MME changes, the MME is an original MME, and a target MME sends the switching request message to the radio network element (such as the eNB) at the target side, and the Anycast address is carried.

In the step, after PDN connection establishment is completed, when the MME sends a bearer correction request to the controller, the controller sends an IP address of the radio-side network element to all of the S-GWs.

Step 201: when the controller receives a Packet_In message and a first uplink data packet from the UE sent by an S-GW, the controller selects the S-GW as an S-GW for the UE.

In the step, an optimal shunt gateway can be selected by allocating the Anycast address of the S-GWs for the UE, wherein a data packet with the Anycast address can be routed to a host closest to an attachment position of the UE in a group of targets.

In the step, the S-GW which sends the Packet_In message and the first uplink data packet is an S-GW which receives the first uplink data packet.

In the step, the S-GW and the L-GW can be either combined or separated. When the S-GW and the L-GW are combined, the controller selects the S-GW and at the same time the corresponding L-GW is selected.

When the S-GW and the L-GW are separated, the L-GW can be selected according to the selected S-GW and network topological information. A specific method about how to select the L-GW according to the selected S-GW and the network topological information belongs to the conventional art and cannot be used for limiting the protection scope of the present disclosure.

The method for selecting the shunt gateway according to an embodiment of the present disclosure further includes that:

Step 202: the controller issues a traffic table including an IP address of the L-GW to the selected S-GW, and issues a traffic table including an IP address of the selected S-GW to the L-GW.

In the step, the controller may also send an IP address of he radio-side network element to the selected S-GW.

In the step, in a PDN disconnection process, when the controller receives a session deletion request from the MME, the controller sends a message of deleting the allocated Anycast address and the IP address of the radio-side network element to the selected S-GW.

Figure 1:
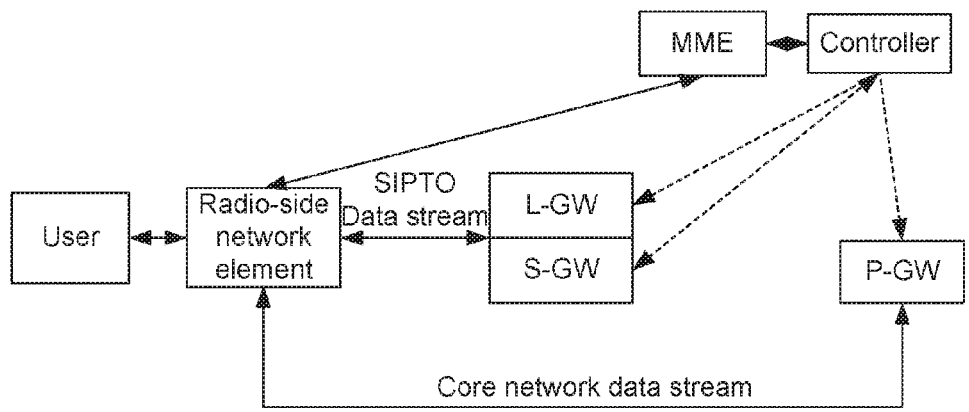
FIG. 1 is a diagram illustrating a conventional SDN-based SIPTO implementation system.
Figure 3:
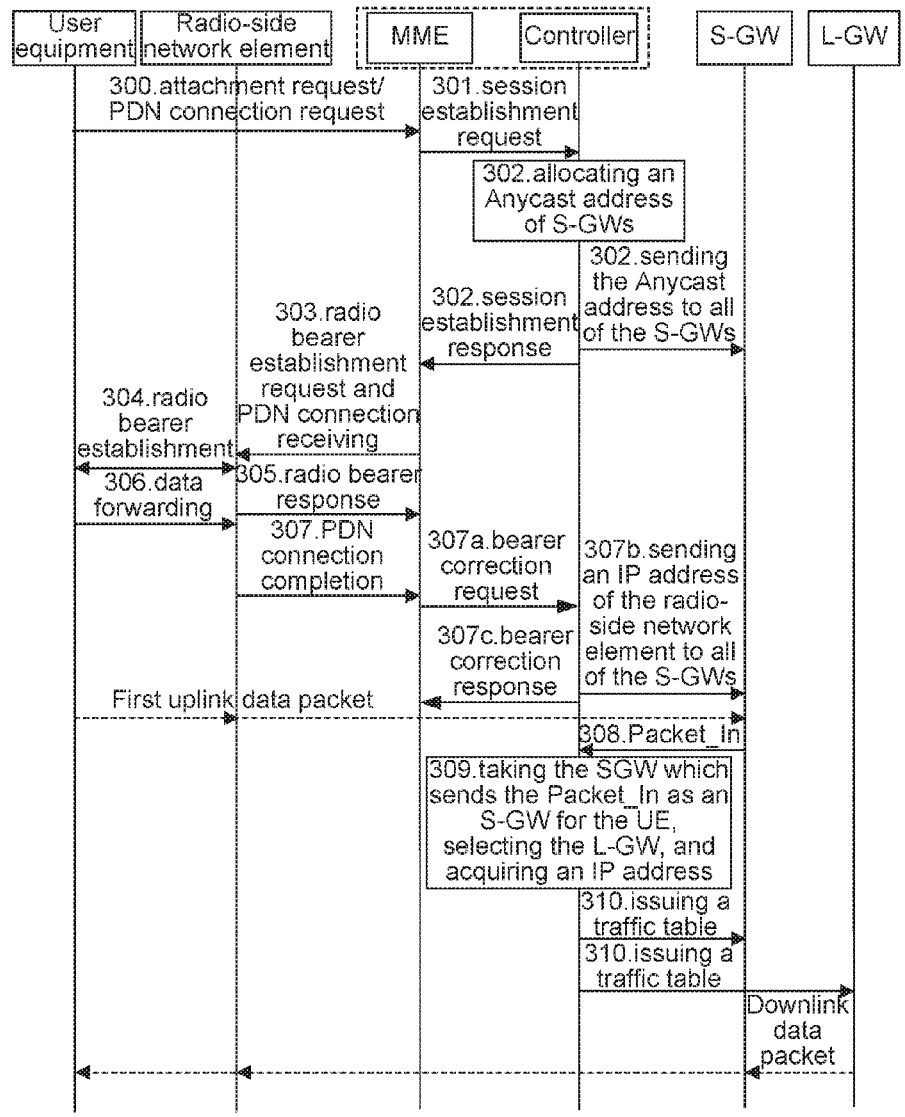
FIG. 3 is a flow chart showing an embodiment of a method for establishing a PDN connection according to an embodiment of the present disclosure.

FIG. 3 is a flow chart showing an embodiment of a method for establishing PDN connection based on a system in FIG. 1. The method includes the following steps.

Step 300: the UE sends the PDN connection request to the MME via the radio-side network element.

Step 301: the MME performs SIPTO authorization according to contracting information of the UE and an Access Point Name (APN), and sends a session establishment request to the corresponding controller.

Step 302: the controller allocates the Anycast address of the S-GWs for the UE, and sends the allocated Anycast address for all of the S-GWs, and sends a session establishment response to the MME.

Step 303: the MME sends a radio bearer establishment request and a PDN connection receiving message to the radio-side network element.

Step 304: a radio bearer is established between the UE and the radio-side network element.

Step 305: the radio-side network element sends a radio bearer establishment response message to the MME.

Step 306: the UE sends data forwarding to the radio-side network element.

Step 307: the radio-side network element sends, to the MME, a message indicating that PDN connection establishment is completed.

Step 307*a*: the MME sends the bearer correction request to the controller.

Step 307*b*: the controller sends the IP address of the radio-side network element to all of the S-GWs.

Step 307*c*: the controller sends a bearer correction response to the MME.

Step 307*a* to Step 307*c* are optional steps.

Step 308: when the S-GW receives the first uplink data packet from the radio-side network element, the S-GW sends the Packet_In message and the first uplink data packet to the controller.

Step 309: the controller takes the S-GW which sends the Packet_In message as an S-GW serving the UE, selects the L-GW according to the selected S-GW and the network topological information, and acquires the IP addresses of the S-GW and the selected L-GW.

Step 310: the controller issues the traffic table including the IP address of the selected L-GW to the S-GW, and issues the traffic table including the IP address of the S-GW to the selected L-GW.

If the optional steps (Step 307*a* to Step 307*c*) are not executed, Step 310 further includes that: the controller sends the IP address of the radio-side network element and a fourth Tunnel Endpoint Identifier (TEID) to the S-GW serving the UE.

The above embodiment describes a situation in which the S-GW and the L-GW are separated. If the S-GW and the L-GW are combined, the controller does not need to issue the traffic table including the IP address of the S-GW to the L-GW in Step 310. As thus, Step 309 and Step 310 may be as follows:

Step 309: the controller takes the S-GW which sends the Packet_In message and the corresponding L-GW as the shunt gateway serving the UE; and Step 310: the controller sends the IP address of the radio-side network element to the S-GW serving the UE.

After PDN establishment is completed, data channels between the radio-side network element and the S-GW and between the S-GW and the L-GW are established for data transmission. The data channels herein are GTP tunnels based on General packet radio service Tunnel Protocol (GTP). In order to establish of the GTP tunnels, in addition to an IP address of an opposite-end network element, TEID information is also included. In sending data, as long as each network element needs to know the TEID and IP address of the opposite-end network element, the data can be sent. Thus, the controller further needs to inform the S-GW of the TEID of the opposite-end network element to which the S-GW sends the data. A specific informing method belongs to the conventional art and cannot be used for limiting the protection scope of the present disclosure.

Figure 4:
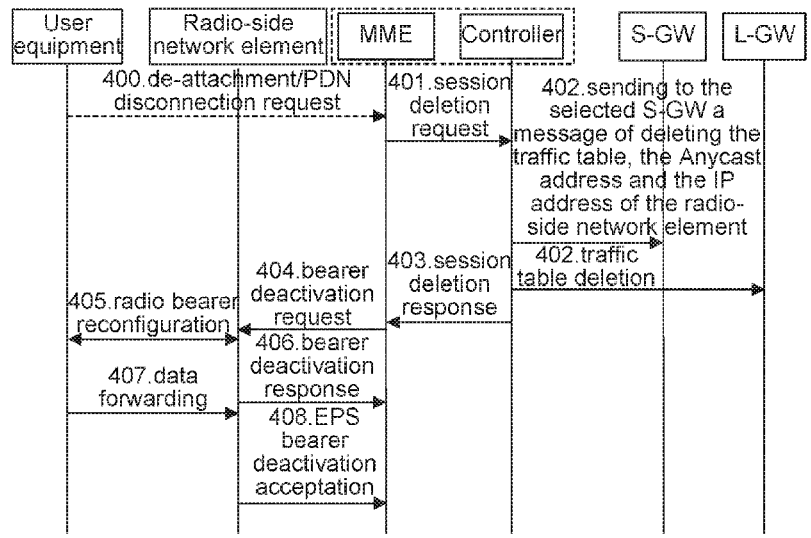
FIG. 4 is a flow chart showing an embodiment of a method for disconnecting a PDN connection according to an embodiment of the present disclosure.

FIG. 4 is a flow chart showing an embodiment of a method of disconnecting PDN connection based on a system in FIG. 1. The method includes the following steps.

Step 400: the UE initiates a PDN disconnection request to the MME via the radio-side network element, or the MME actively initiates the PDN disconnection request.

Step 401: the MME sends the session deletion request to the controller.

Step 402: the controller sends, to the selected S-GW, a message of deleting the traffic table including the IP address of the selected L-GW, the allocated Anycast address and the IP address of the radio-side network element, and sends a message of deleting the traffic table including the IP address of the selected S-GW to the selected L-GW.

Step 403: the controller sends a session deletion response to the MME.

Step 404: the MME sends a bearer deactivation request to the radio-side network element.

Step 405: radio resources between the radio-side network element and the UE are reconfigured.

Step 406: the radio-side network element sends a bearer deactivation response to the MME.

Step 407: the UE sends a data forwarding message to the radio-side network element.

Step 408: the radio-side network element sends, to the MME, a message of bearer deactivation acceptation of an Evolved Packet System (EPS).

Figure 5:
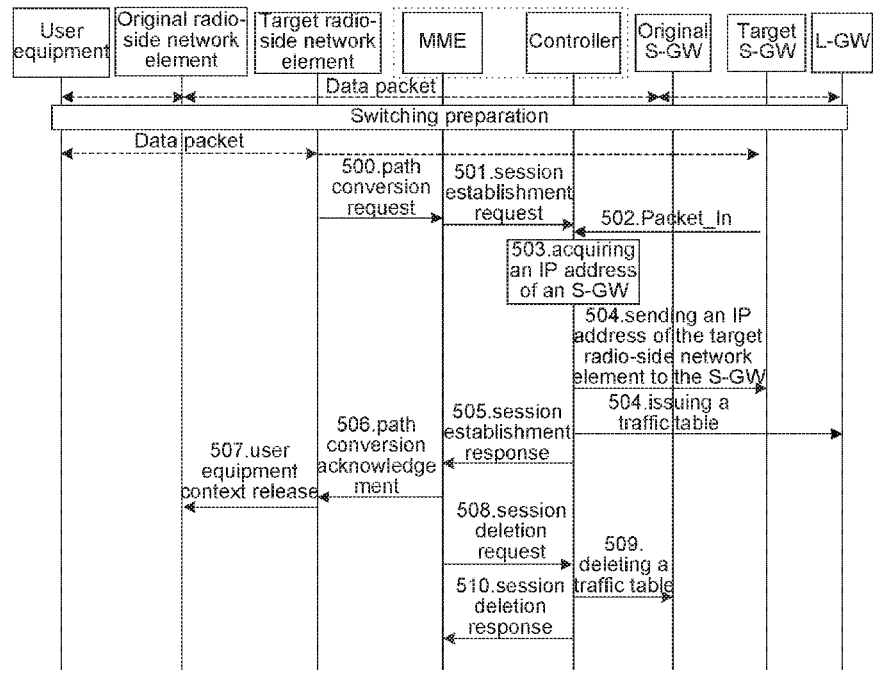
FIG. 5 is a flow chart showing an embodiment of a user switching method when an S-GW is changed according to an embodiment of the present disclosure.

FIG. 5 is a flow chart showing a method for switching the UE when the S-GW is changed according to an embodiment of the present disclosure. As shown in FIG. 5, when the S-GW is the original S-GW and the S-GW is changed, the method includes the following steps.

Step 500: after switching preparation and switching execution are completed by the UE, a target radio-side network element sends a path conversion request to the MME.

Step 501: the MME sends the session establishment request to the controller.

Step 502: after receiving the first uplink data packet from the target radio-side network element, a target S-GW sends the Packet_In message and the first uplink data packet to the controller.

Step 503: the controller selects the target S-GW and acquires an IP address of the target S-GW.

Step 504: the controller issues the traffic table including the IP address of the L-GW to the target S-GW, sends an IP address of the target radio-side network element to the target S-GW, and issues a traffic table including the IP address of the target S-GW to the L-GW.

Step 505: the controller sends a session establishment response message to the MME.

Step 506: the MME sends a path conversion acknowledgement to the target radio-side network element.

Step 507: the target radio-side network element sends a context release message of the UE to the radio-side network element.

Step 508: the MME sends the session deletion request to the controller.

Step 509: the controller sends information of deleting the traffic table including the IP address of the corresponding L-GW to the original S-GW, and deletes the IP address of the original S-GW.

Step 510: the controller sends the session deletion response to the MME.

When the L-GW is an original L-GW and the controller judges that a current path leading to the original L-GW is not optimal, Step 510 further includes that the controller sends information of deleting the traffic table including the IP address of the original S-GW to the original L-GW, and deletes the IP address of the original L-GW.

The above embodiment describes the situation in which the S-GW and the L-GW are separated. If the S-GW and the L-GW are combined, the controller selects the target S-GW and a corresponding target L-GW in Step 503. It only needs to send the IF address of a target-side radio network element to the target S-GW in Step 505. Step 509 further includes that the controller sends the information of deleting the traffic table including the IF address of the original S-GW to the original L-GW, and deletes the IF address of the original L-GW.

Figure 6:
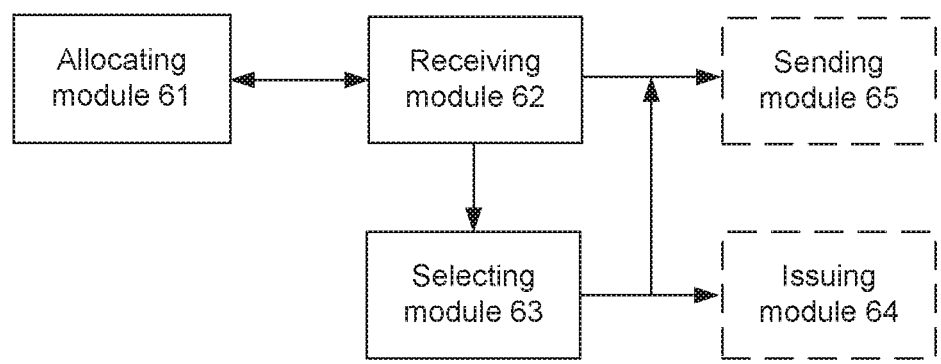
FIG. 6 is a structural diagram illustrating a controller according to an embodiment of the present disclosure.

As shown in FIG. 6, a controller is also provided in the embodiments of the present disclosure, which includes:

an allocating module 61, configured to allocate an Anycast address of S-GWs for a UE, send the Anycast address to all of the S-GWs, and send the Anycast address to a radio-side network element via an MME;

a receiving module 62, configured to receive a Packet_In message and a first uplink data packet from the UE sent by the S-GW; and a selecting module 63, configured to select the S-GW as an S-GW for the UE.

The controller according to the embodiments of the present disclosure further includes:

an issuing module 64, configured to issue a traffic table including an IP address of an L-GW to the selected S-GW, and issue a traffic table including an IP address of the selected S-GW to the L-GW.

The controller according to the embodiments of the present disclosure further includes:

a sending module 65, configured to send an IP address of the radio-side network element to the selected S-GW.

In the controller according to the embodiments of the present disclosure, the receiving module 62 is further configured to receive a session deletion request from the MME; and the sending module 65 is further configured to send a message of deleting the allocated Anycast address and the IP address of the radio-side network element to the selected S-GW.

The allocating module, the selecting module, the receiving module, the issuing module and the sending module can be implemented by hardware such as a CPU or a DSP in the controller.

In several embodiments provided in the present disclosure, it should be understood that the disclosed apparatus and method can be implemented in other manners. The apparatus embodiments described above are only exemplary. For example, unit division is only logical function division, and additional division manners can be adopted in an actual implementation process. For example, a plurality of units or components can be combined or can be integrated to another system, or some features can be ignored or not be executed. In addition, coupling or direct coupling or communication connection between all displayed or discussed constituent parts can be performed via some interfaces, and indirect coupling or communication connection between the devices or the units can be in an electrical form, a mechanical form or in other forms.

The above units described as separation parts can be or can be not physically separated, and the parts displayed as the units can be or can be not physical units, namely the units can be located at a place or can be distributed on a plurality of network units. Part or all of the units can be selected to achieve the objects of the solutions of the embodiments according to actual requirements.

In addition, all of functional units in each embodiment of the present disclosure can be integrated into a processing unit, each unit can be taken as a unit individually, and two or more units can be integrated in a unit. The integrated units can be implemented in a hardware form and can be implemented in a combination of hardware and software.

Those skilled in the art can understand that: all or part of the steps implementing the embodiments of the method can be completed via hardware in combination with instructions of a program. The program can be stored in a computer readable storage medium. When the program is executed, the steps including the embodiments of the method are executed. The storage medium includes various media capable of storing program codes, such as a mobile storage device, a Read-Only Memory (ROM), a Random Access Memory (RAM), a disk or an optical disc.

Alternatively, if the integrated units in the present disclosure are implemented in a software function module form and are sold or used as independent products, the units can also be stored in the computer readable storage medium. In view of this understanding, the technical solutions of the embodiments of the present disclosure can be embodied in a software product form naturally or with respect to contribution parts in the conventional art. A computer software product is stored in a storage medium including a plurality of instructions configured to enable a computer device (such as a personal computer, a server or a network device) to execute all or part of the methods according to all embodiments of the present disclosure. The storage medium includes various media capable of storing the program codes, such as the mobile storage device, the ROM, the RAM, the disk or the optical disc.

The above is only the detailed description of the present disclosure. However, the protection scope of the present disclosure is not limited thereto. Those skilled in the art can easily figure out modifications or variations, which should fall within the protection scope of the present disclosure, within the technical scope disclosed in the present disclosure. Thus, the protection scope of the present disclosure should be in accordance with the protection scope of the claims.

The invention claimed is:

1. A method for selecting a shunt gateway, comprising:
   allocating, by a controller, an Anycast address of Serving Gateways (S-GWs) for a user equipment, and sending the Anycast address to all of the S-GWs; sending the Anycast address to a radio-side network element via a Mobility Management Entity (MME); and
   when the controller receives a Packet_In message and a first uplink data packet from the user equipment sent by an S-GW, selecting, by the controller, the S-GW as an S-GW for the user equipment.

2. The method according to claim 1, wherein sending the allocated Anycast address to the radio-side network element via the MME comprises:
   sending, by the controller, the Anycast address to the MME via a session establishment response message; and
   sending, by the MME, the allocated Anycast address to the radio-side network element via a radio bearer establishment request message or a path conversion acknowledgement message or a switching request message.

3. The method according to claim 2, wherein in an attachment process or a Packet Data Network (PDN) connection establishment process, before allocating, by the controller, the Anycast address of the S-GWs for the user equipment, the method further comprises:
   receiving, by the MME, an attachment request or a PDN connection request from the user equipment; and
   sending a session establishment request to a corresponding controller.

4. The method according to claim 2, wherein in a switching process, before allocating, by the controller, the Anycast address of the S-GWs for the user equipment, the method further comprises:
   receiving, by the MME, a path conversion request message from a target-side radio network element or a forwarding re-locating request message from an original MME; and
   sending, by the MME, the session establishment request to a corresponding controller.

5. The method according to claim 2, wherein the S-GW and a Local Gateway (L-GW) are separated, and wherein after the controller selects the S-GW as the S-GW for the user equipment, the method further comprises:
   issuing, by the controller, a traffic table including an IP address of the L-GW to the selected S-GW, and
   issuing a traffic table including an IP address of the selected S-GW to the L-GW.

6. The method according to claim 2, further comprising:
   sending, by the controller, an IP address of the radio-side network element to the selected S-GW.

7. The method according to claim 2, wherein when the controller receives a bearer correction request from the MME, the method further comprises:
   sending, by the controller, the IP address of the radio-side network element to all of the S-GWs.

8. The method according to claim 1, wherein in an attachment process or a Packet Data Network (PDN) connection establishment process, before allocating, by the controller, the Anycast address of the S-GWs for the user equipment, the method further comprises:
   receiving, by the MME, an attachment request or a PDN connection request from the user equipment; and
   sending a session establishment request to a corresponding controller.

9. The method according to claim 1, wherein in a switching process, before allocating, by the controller, the Anycast address of the S-GWs for the user equipment, the method further comprises:
   receiving, by the MME, a path conversion request message from a target-side radio network element or a forwarding re-locating request message from an original MME; and
   sending, by the MME, the session establishment request to a corresponding controller.

10. The method according to claim 1, wherein the S-GW and a Local Gateway (L-GW) are separated, and wherein after the controller selects the S-GW as the S-GW for the user equipment, the method further comprises:
    issuing, by the controller, a traffic table including an IP address of the L-GW to the selected S-GW, and
    issuing a traffic table including an IP address of the selected S-GW to the L-GW.

11. The method according to claim 1, further comprising:
    sending, by the controller, an IP address of the radio-side network element to the selected S-GW.

12. The method according to claim 11, further comprising:
    when the controller receives a session deletion request from the MME in a de-attachment process or a PDN disconnection process,
    sending, by the controller, a message of deleting the allocated Anycast address and the IP address of the radio-side network element to the selected S-GW.

13. The method according to claim 1, wherein when the controller receives a bearer correction request from the MME, the method further comprises:
    sending, by the controller, the IP address of the radio-side network element to all of the S-GWs.

14. A controller, comprising:
a processor; and
a memory for storing instructions executable by the processor;
wherein the processor is configured to:
allocate an Anycast address of Serving Gateways (S-GWs) for a user equipment, send the Anycast address to all of the S-GWs, and send the Anycast address to a radio-side network element via an MME;
receive a Packet_In message and a first uplink data packet from the user equipment sent by an S-GW; and
select the S-GW as an S-GW for the user equipment.

15. The controller according to claim 14, wherein the processor is further configured to:
issue a traffic table including an IP address of an L-GW to the selected S-GW, and issue a traffic table including an IP address of the selected S-GW to the L-GW.

16. The controller according to claim 15, wherein the processor is further configured to:
send an IP address of the radio-side network element to the selected S-GW.

17. The controller according to claim 16, wherein the processor is further configured to:
receive a session deletion request from the MME; and
send a message of deleting the allocated Anycast address and the IP address of the radio-side network element to the selected S-GW.

\* \* \* \* \*